(12) United States Patent
Fujimori et al.

(10) Patent No.: US 11,525,692 B2
(45) Date of Patent: Dec. 13, 2022

(54) INFORMATION PROCESSING APPARATUS, INFORMATION PROCESSING SYSTEM, INFORMATION PROCESSING METHOD, AND VEHICLE

(71) Applicant: TOYOTA JIDOSHA KABUSHIKI KAISHA, Toyota (JP)

(72) Inventors: Kazunori Fujimori, Nagoya (JP); Shoryu Todo, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 17/232,605

(22) Filed: Apr. 16, 2021

(65) Prior Publication Data

US 2021/0372805 A1 Dec. 2, 2021

(30) Foreign Application Priority Data

May 26, 2020 (JP) .............................. JP2020-091553

(51) Int. Cl.
*G01C 21/34* (2006.01)
*G08G 1/14* (2006.01)
*G01C 21/36* (2006.01)
*G08G 1/127* (2006.01)

(52) U.S. Cl.
CPC ..... *G01C 21/3461* (2013.01); *G01C 21/3679* (2013.01); *G08G 1/127* (2013.01); *G08G 1/142* (2013.01)

(58) Field of Classification Search
CPC ............ G01C 21/3461; G01C 21/3679; G08G 1/127; G08G 1/142
See application file for complete search history.

(56) References Cited

U.S. PATENT DOCUMENTS

| | | | |
|---|---|---|---|
| 2008/0033769 A1* | 2/2008 | Koorapati | G08G 1/168 705/13 |
| 2009/0187337 A1* | 7/2009 | Denk, Jr. | G01C 21/20 701/533 |
| 2010/0085214 A1* | 4/2010 | Kim | G08G 1/14 455/414.1 |
| 2011/0140922 A1* | 6/2011 | Levy | H04W 4/027 340/932.2 |
| 2012/0056758 A1* | 3/2012 | Kuhlman | G08G 1/14 340/932.2 |
| 2013/0132102 A1* | 5/2013 | Andrade | G06Q 50/30 705/1.1 |
| 2018/0096263 A1* | 4/2018 | Modi | G07B 15/00 |
| 2018/0164817 A1* | 6/2018 | Herz | G01C 21/3664 |
| 2018/0224294 A1* | 8/2018 | Hao | G01C 21/3492 |

(Continued)

FOREIGN PATENT DOCUMENTS

JP 2014-085776 A 5/2014

*Primary Examiner* — Hussein Elchanti
(74) *Attorney, Agent, or Firm* — Oliff PLC

(57) ABSTRACT

An information processing apparatus includes a controller. The controller determines, based on a preference of a user of a vehicle that enters a parking lot adjacent to a complex facility having a plurality of shops and a plurality of facility entrances, a shop to be used by the user from among the plurality of shops. The controller determines an entrance to be used by the user from among the plurality of facility entrances based on a position of the shop to be used, and outputs a position of the entrance to be used to the vehicle.

13 Claims, 7 Drawing Sheets

(56) References Cited

U.S. PATENT DOCUMENTS

| | | | |
|---|---|---|---|
| 2019/0063947 A1* | 2/2019 | Beaurepaire | G01C 21/3685 |
| 2019/0137292 A1* | 5/2019 | Eno | G01C 21/3484 |
| 2020/0356906 A1* | 11/2020 | Yoshinaga | H04W 4/40 |
| 2021/0280062 A1* | 9/2021 | Baird | G08G 1/147 |

* cited by examiner

INFORMATION PROCESSING APPARATUS, INFORMATION PROCESSING SYSTEM, INFORMATION PROCESSING METHOD, AND VEHICLE

CROSS-REFERENCE TO RELATED APPLICATION

This application claims priority to Japanese Patent Application No. 2020-091553, filed on May 26, 2020, the entire contents of which are incorporated herein by reference.

TECHNICAL FIELD

The present disclosure relates to an information processing apparatus, an information processing system, an information processing method, and a vehicle.

BACKGROUND

A parking lot vacancy information notifying system for displaying vacancy information in a large parking lot is known. For example, see patent literature (PTL) 1.

CITATION LIST

Patent Literature

PTL 1: JP 2014-085776 A

SUMMARY

Demand exists for improving the convenience of parking lot guidance for the user of a vehicle.

It would be helpful to improve the convenience for the user of a vehicle.

An information processing apparatus according to an embodiment of the present disclosure includes a controller. The controller is configured to determine, based on a preference of a user of a vehicle that enters a parking lot adjacent to a complex facility having a plurality of shops and a plurality of facility entrances, a shop to be used by the user from among the plurality of shops. The controller is configured to determine an entrance to be used by the user from among the plurality of facility entrances based on a position of the shop to be used, and output a position of the entrance to be used to the vehicle.

An information processing system according to an embodiment of the present disclosure includes the information processing apparatus and the vehicle.

An information processing method according to an embodiment of the present disclosure includes determining, by an information processing apparatus, based on a preference of a user of a vehicle that enters a parking lot adjacent to a complex facility having a plurality of shops and a plurality of facility entrances, a shop to be used by the user from among the plurality of shops. The information processing method includes determining, by the information processing apparatus, an entrance to be used by the user from among the plurality of facility entrances based on a position of the shop to be used, and outputting a position of the entrance to be used to the vehicle.

A vehicle according to an embodiment of the present disclosure is a vehicle for boarding a user. The vehicle is configured to park in a parking space closest to an entrance to be used by the user when the vehicle enters a parking lot adjacent to a facility having a plurality of shops and a plurality of facility entrances, the entrance to be used being determined from among the plurality of facility entrances based on a preference of the user.

According to the information processing apparatus, the information processing system, the information processing method, and the vehicle of an embodiment of the present disclosure, the convenience for a user of a vehicle can be improved.

DETAILED DESCRIPTION (Configuration of Information Processing System 1)

Figure 1:
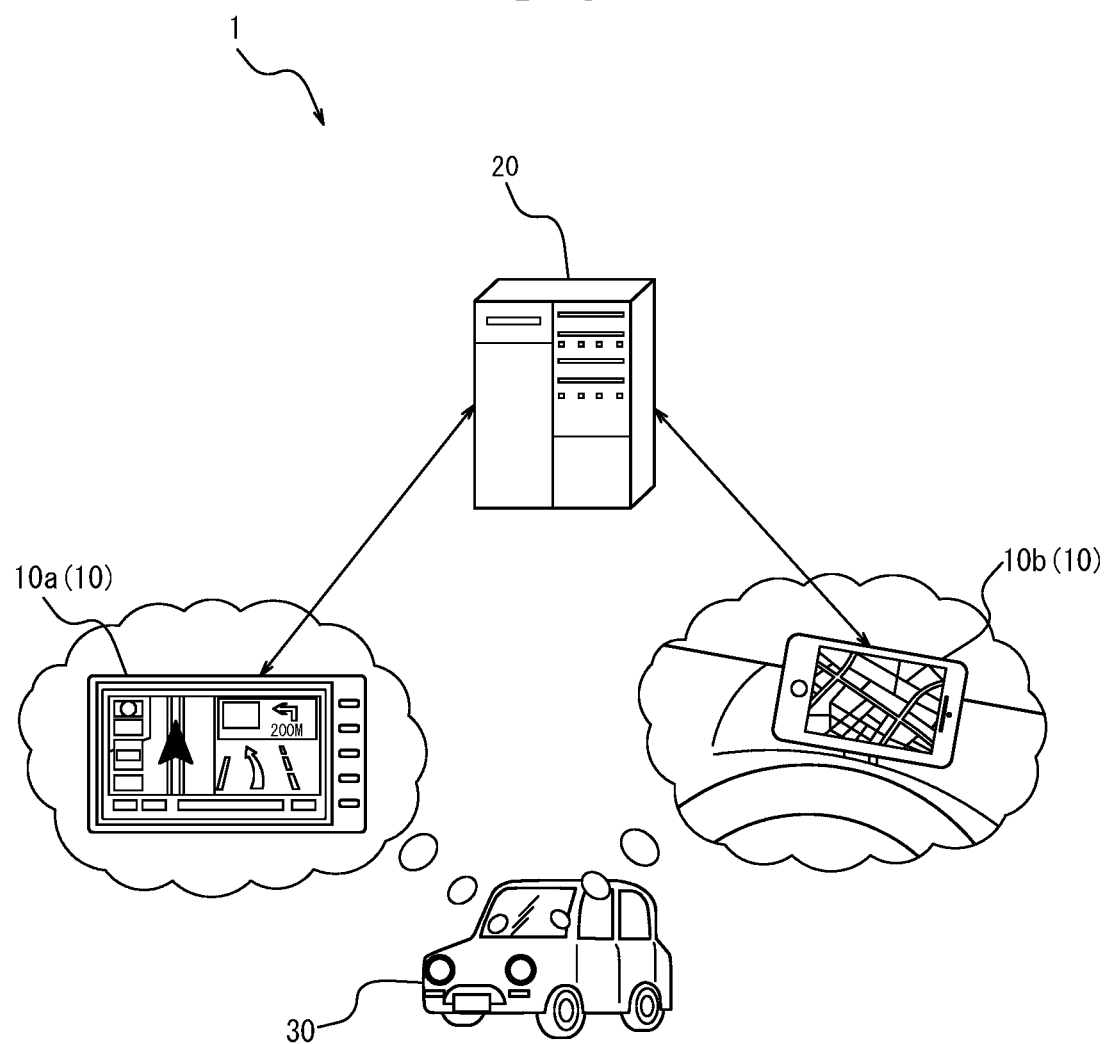
FIG. 1 is a schematic diagram illustrating a configuration example of an information processing system according to an embodiment.
Figure 2:
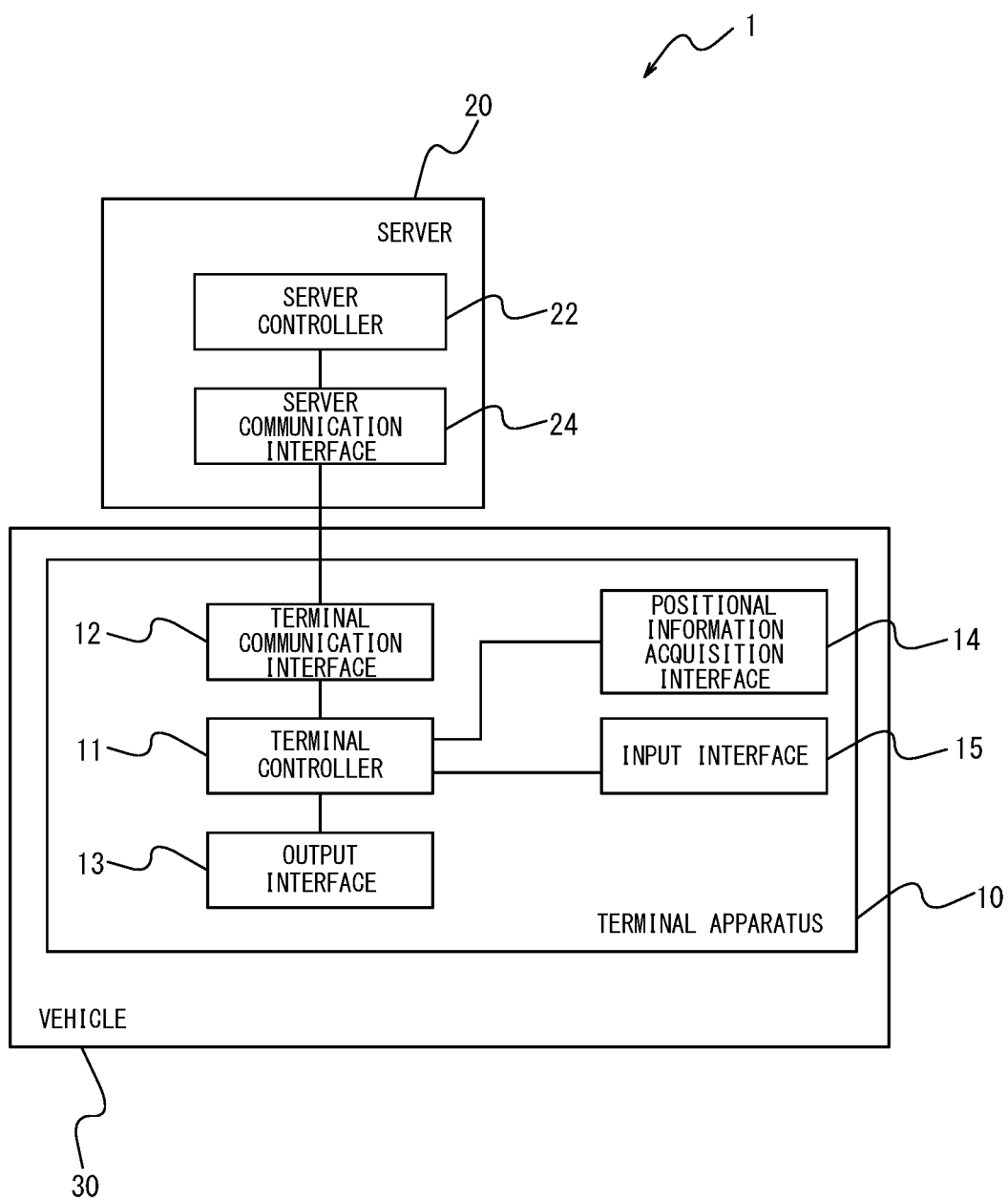
FIG. 2 is a block diagram illustrating a configuration example of an information processing system according to an embodiment.

As illustrated in FIGS. 1 and 2, an information processing system 1 according to an embodiment includes a vehicle 30 and a terminal apparatus 10. The information processing system 1 may optionally further include a server 20.

The vehicle 30 is boarded by a driver and travels by being driven by the driver. The vehicle 30 may also be occupied by a passenger. The driver or the passenger of the vehicle 30 is also referred to as a user of the vehicle 30.

The terminal apparatus 10 is mounted on the vehicle 30. The terminal apparatus 10 may be a car navigation apparatus that provides a navigation function of the vehicle 30. The car navigation apparatus is illustrated in FIG. 1 as a terminal apparatus 10a attached to the vehicle 30. The terminal apparatus 10 may be a portable terminal, such as a smartphone or a tablet, that executes an application to provide a navigation function of the vehicle 30. The portable terminal is illustrated in FIG. 1 as a terminal apparatus 10b. The terminal apparatus 10b as a portable terminal may be attached to a dashboard or console of the vehicle 30 or may be carried by a user of the vehicle 30.

The terminal apparatus 10 includes a terminal controller 11, a terminal communication interface 12, an output interface 13, an input interface 15, and a positional information acquisition interface 14.

The terminal controller 11 may include one or more processors. The "processor" is a general-purpose processor, a dedicated processor specialized for specific processing, or the like in the present embodiment but is not limited to these. The terminal controller 11 may include one or more dedicated circuits. The dedicated circuit may include, for example, a field-programmable gate array (FPGA) or an application specific integrated circuit (ASIC). The terminal controller 11 may include a dedicated circuit instead of or in addition to the processor.

The terminal controller 11 may include a memory. The memory is a semiconductor memory, a magnetic memory, an optical memory, or the like, for example, but is not limited to these. The memory may function, for example, as a main memory, an auxiliary memory, or a cache memory. The memory may include an electromagnetic storage medium such as a magnetic disc. The memory may include a non-transitory computer readable medium. The memory stores any information used for the operation of the terminal apparatus 10. For example, the memory may store a system program, an application program, or the like. The terminal apparatus 10 may include a memory separate from the terminal controller 11.

The terminal communication interface 12 is communicably connected to an external apparatus, such as a server 20. The terminal communication interface 12 may be communicably connected to an external apparatus, such as the server 20, over a network. The terminal communication interface 12 may include a communication module that connects to a network or an external apparatus. The communication module may include, but is not limited to, a communication module compliant with a mobile communication standard such as the 4th generation (4G) or the 5th generation (5G) standards.

The output interface 13 may output visual information such as images, characters, or graphics. The output interface 13 may be configured to include a display device. The display device may include a light emitting device such as a light emitting diode (LED). The display device may include, for example, a liquid crystal display (LCD), an organic electro-luminescence (EL) display, or an inorganic EL display. The display device may include a plasma display panel (PDP). The display device is not limited to these displays and may include various other types of displays.

The output interface 13 may, for example, output audio information such as voice. The output interface 13 may include a device, such as a speaker, for outputting audio. The output interface 13 is not limited to these examples and may include various other devices.

The input interface 15 includes an input device for receiving operations or input by a user carrying the terminal apparatus 10. The input device may, for example, include a keyboard or a physical key, a touch panel, a touch sensor, or a pointing device such as a mouse. When the input device is a touch panel or a touch sensor, the input device may be configured integrally with the display of the output interface 13. The input device may, for example, include a microphone or the like that receives voice input. The input interface 15 is not limited to these examples of input devices and may include a variety of other devices.

The positional information acquisition interface 14 acquires positional information for the terminal apparatus 10. The positional information acquisition interface 14 may include a receiver compliant with a satellite positioning system. The receiver compliant with the satellite positioning system may include, for example, a Global Positioning System (GPS) receiver. In the present embodiment, it is assumed that the terminal apparatus 10 can use the positional information acquisition interface 14 to acquire positional information for the terminal apparatus 10 itself.

The server 20 includes a server controller 22 and a server communication interface 24. The server controller 22 may include one or more processors or may include one or more dedicated circuits. The server controller 22 may be configured similarly to the terminal controller 11. The server 20 or the server controller 22 may include a memory. The server communication interface 24 is communicably connected to an external apparatus such as the terminal apparatus 10. The server communication interface 24 may be communicably connected to an external apparatus, such as the terminal apparatus 10, over a network. The server communication interface 24 may include a communication module that connects to a network or an external apparatus. The server communication interface 24 may be configured similarly to the terminal communication interface 12. The server 20 may include one or a plurality of server apparatuses capable of communicating with each other.

Figure 3:
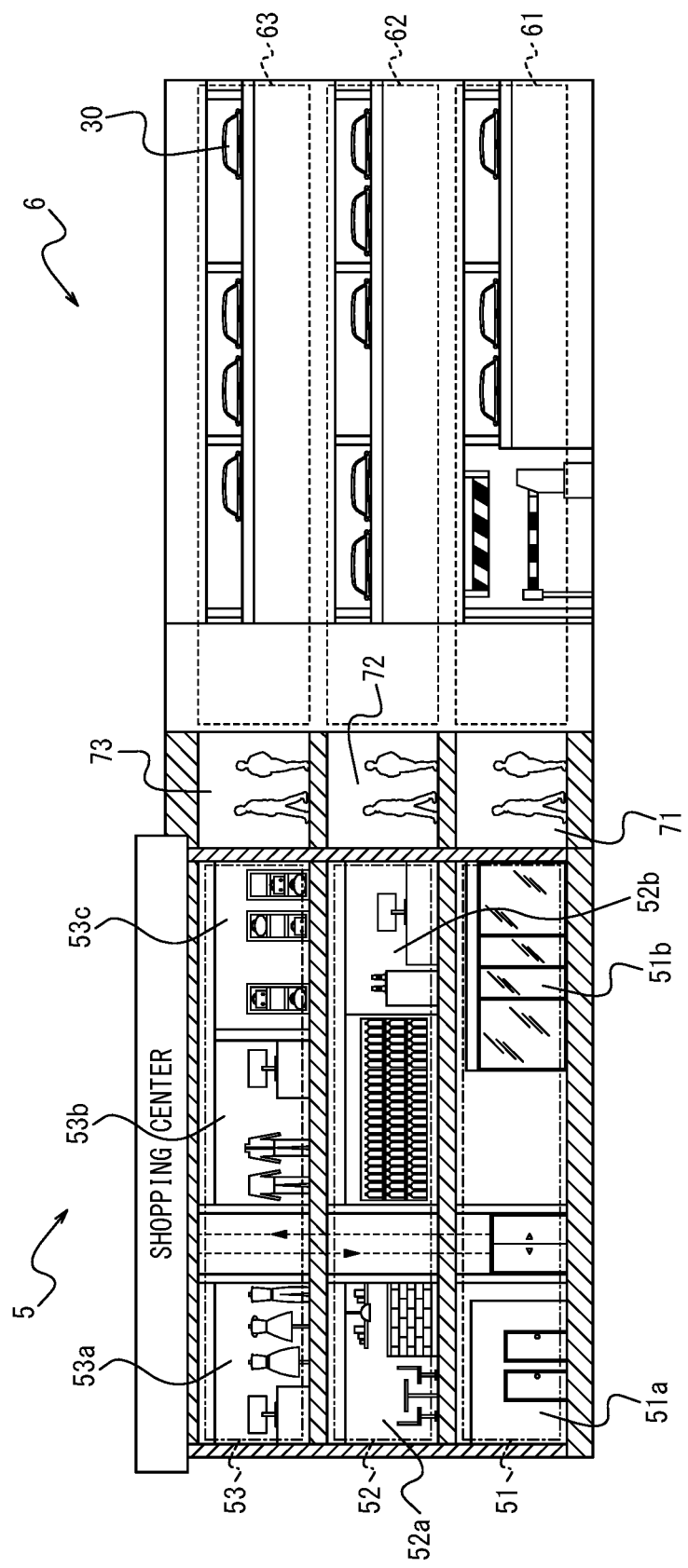
FIG. 3 is a diagram illustrating a configuration example of a complex facility with an adjacent parking garage.
Figure 6:
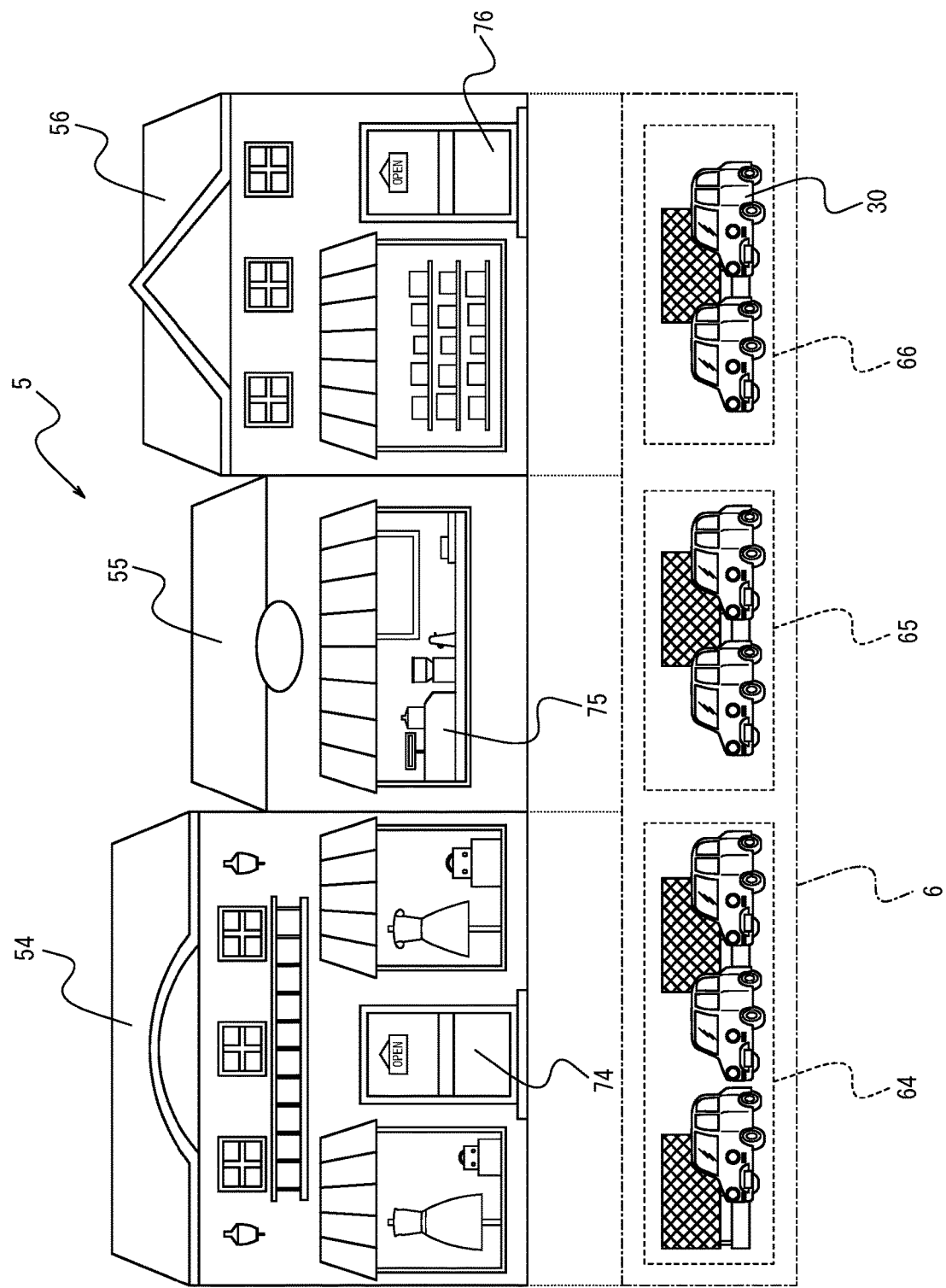
FIG. 6 is a diagram illustrating a configuration example of a single story complex facility with an adjacent single story parking lot.

The information processing system 1 according to the present embodiment guides a vehicle 30 inside a parking lot 6, adjacent to a complex facility 5 illustrated in FIG. 3 or FIG. 6, that the vehicle 30 has entered, for example. The information processing system 1 provides useful information for the driver of the vehicle 30 to select a parking position for the vehicle 30. The information processing system 1 may, for example, determine one entrance based on a relationship between a shop, selected based on a preference of the user of the vehicle 30 and the positions of entrances to the complex facility 5, and notify the driver of the vehicle 30 of the position of the determined entrance. The information processing system 1 may determine a parking space close to the position of the entrance, or a parking space from which it is easy to walk to the entrance, and notify the driver of the vehicle 30 of the position.

The information processing system 1 may cause the terminal apparatus 10 to determine the entrance. In this case, the terminal apparatus 10 notifies the driver of the vehicle 30 by outputting information on the entrance determined by the terminal apparatus 10 itself from the output interface 13.

The information processing system 1 may cause the server 20 to determine the entrance. In this case, the terminal apparatus 10 notifies the driver of the vehicle 30 by acquiring information on the entrance determined by the server 20 and outputting the information from the output interface 13.

In the information processing system 1, the apparatus that determines the entrance is referred to as an information processing apparatus. When the terminal apparatus 10 determines the entrance, the terminal apparatus 10 functions as the information processing apparatus. When the terminal apparatus 10 functions as the information processing apparatus, the terminal controller 11 is also referred to simply as a controller. When the server 20 determines the entrance, the server 20 functions as the information processing apparatus. When the server 20 functions as the information processing apparatus, the server controller 22 is also referred to simply as a controller. Hereinafter, an embodiment is described in which the terminal apparatus 10 is mounted on the vehicle 30 as a car navigation apparatus and determines the entrance. The terminal apparatus 10 may be mounted on the vehicle 30 as a portable terminal or may be carried by the user of the vehicle 30. The operations of the terminal apparatus 10 as an information processing apparatus in an embodiment described below can be replaced by operations of the server 20.

(Configuration Example of Complex Facility 5 and Adjacent Parking Lot 6)

As illustrated in FIG. 3, the case of a complex facility 5, having a plurality of shops and a plurality of entrances, and a parking lot 6 adjacent to the complex facility 5 is considered. The user of the vehicle 30 parks the vehicle 30 in the parking lot 6 to visit a shop located within the complex facility 5. In other words, the user of the vehicle 30 parked in the parking lot 6 can select a shop to visit from among the plurality of shops in the complex facility 5 and visit the shop through one entrance among the plurality of entrances. The driver of the vehicle 30 wishes to park the vehicle 30 at a position from which it is easy to move to the desired shop. However, it may be difficult for the driver of the vehicle 30 to determine such a position. A parking lot 6 where it is difficult for the user to determine where to park the vehicle 30 is also referred to as a difficult parking lot. In the present embodiment, a difficult parking lot refers to the parking lot 6 adjacent to the complex facility 5 that has a plurality of shops and a plurality of entrances.

The complex facility 5 includes a first shop floor 51, a second shop floor 52, and a third shop floor 53. The first shop floor 51 corresponds to the first floor. Shops 51a, 51b are located on the first shop floor 51. The second shop floor 52 corresponds to the second floor. Shops 52a, 52b are located on the second shop floor 52. The third shop floor 53 corresponds to the third floor. Shops 53a, 53b, 53c are located on the third shop floor 53.

The parking lot 6 adjacent to the complex facility 5 includes a first parking floor 61, a second parking floor 62, and a third parking floor 63. The first entrance 71 is located between the first parking floor 61 and the first shop floor 51. The second entrance 72 is located between the second parking floor 62 and the second shop floor 52. The third entrance 73 is located between the third parking floor 63 and the third shop floor 53. The first entrance 71, the second entrance 72 and the third entrance 73 are collectively referred to as entrances. A user who parks the vehicle 30 in the parking lot 6 exits the vehicle 30, goes to the complex facility 5 through any of the entrances, and visits one of the shops located in the complex facility 5.

The complex facility 5 illustrated in FIG. 3 has one entrance on each shop floor. The number of entrances of each shop floor is not limited to one and may be two or more. The entrances to the complex facility 5 are also referred to as the facility entrances.

<Determination of Shop to be Used and Entrance to be Used>

The terminal controller 11 of the terminal apparatus 10 determines a shop recommended to be used by the user of the vehicle 30 based on the preferences of the user. The shop recommended to be used by the user is also called a shop to be used.

The terminal controller 11 acquires information about the preferences of the user of the vehicle 30. The information about the preferences of the user is also referred to as preference information. Specifically, the preferences of the user of the vehicle 30 correspond to the degree of interest of the user. That is, the preference information corresponds to information representing the degree of interest of the user. The terminal controller 11 determines a shop that matches the preferences of the user as a shop to be used based on the preference information for the user. The terminal controller 11 may assign a priority rank to each shop representing the degree to which the preferences of the user are matched.

Shops are classified into categories. Shops may be classified into point of interest (POI) categories. A POI refers to an object of interest to the user. The POI categories include, for example, fashion, interior, dining, or services as categories of interest to the user. The POI categories can be considered as being one of the criteria for classifying shops. Shops are not limited to POI categories and may be classified by other criteria. For example, shops may be classified into categories defined by the age, gender, or the like of customers targeted by the shops.

The terminal controller 11 may assign a priority rank to each category based on the degree of interest of the user in the categories that classify the shops. In the present embodiment, the degree of interest of the user for each category is represented by a score calculated for each category. The terminal controller 11 can assign a priority rank to each category based on the magnitude relationship between the scores for each category. In the present embodiment, the higher the value of the score, the higher the priority rank of the category. The preference information is assumed to include the score calculated for each category. Specific examples of score calculation are described below. The degree of interest of the user in each shop is not limited to the score for each category and may be calculated as a score for each shop.

The terminal controller 11 may notify the user of information including the name, position, or the like of the shop to be used in order to encourage the user to use the determined shop to be used. The terminal controller 11 may notify the user of the vehicle 30 by causing the output interface 13 of the terminal apparatus 10 to display the determined information about the shop to be used.

Based on the position of the shop to be used within the complex facility 5, the terminal controller 11 determines an entrance recommended to be used by the user of the vehicle 30 from among the plurality of facility entrances. The entrance recommended to be used by the user is also referred to as an entrance to be used. The terminal controller 11 outputs the position of the determined entrance to be used to the vehicle 30. The terminal controller 11 may notify the driver of the vehicle 30 by causing the output interface 13 to display the position of the determined entrance to be used.

Based on the position of the determined entrance to be used, the terminal controller 11 may determine a parking space to recommend for parking the vehicle 30. The parking space to recommend for parking the vehicle is also referred to as a space to be used. The terminal controller 11 may determine the space to be used from among the usable parking spaces in the parking lot 6. The usable parking spaces may include empty parking spaces. The usable parking spaces may include parking spaces that are large enough for the exterior size of the vehicle 30. The terminal controller 11 outputs the position of the determined space to be used to the vehicle 30. The terminal controller 11 may notify the driver of the vehicle 30 by causing the output interface 13 to display the position of the determined space to be used.

The information processing system 1 and the information processing apparatus according to the present embodiment can output the position of the entrance to be used, determined based on preferences of the user of the vehicle 30, to the vehicle 30 that has entered the parking lot 6 adjacent to the complex facility 5. The vehicle 30 can judge where to park based on the position of the entrance to be used. In this way, the driver of the vehicle 30 can easily judge the position for parking the vehicle 30. Furthermore, the user of the vehicle 30 can easily visit a shop that matches the preferences of the user. The convenience for the user of the vehicle 30 can therefore be improved.

<User Confirmation of Candidate Shop>

Based on the preference information of the user of the vehicle 30, the terminal controller 11 may determine a candidate shop, which becomes a candidate for the shop to be used, from among the plurality of shops located in the complex facility 5. The terminal controller 11 may notify the user of the candidate shop and cause the user to select or confirm the shop that becomes the shop to be used.

When the preference information includes a score for each shop, the terminal controller 11 may determine the shop having the highest score as the candidate shop or may determine a shop having a score equal to or greater than a predetermined value as the candidate shop. When the preference information includes a score for each category, the terminal controller 11 may determine a shop that is included in the category with the highest score as the candidate shop. The terminal controller 11 may determine a shop that is included in a category with a score equal to or greater than a predetermined value as the candidate shop.

When a plurality of candidate shops exist, the terminal controller 11 may narrow down the candidate shops based on other conditions. The terminal controller 11 may, for example, narrow down the candidate shops based on the distance from the entrance to the candidate shops. The terminal controller 11 may limit the candidate shop to the shop located closest to the entrance or shops located within a predetermined distance from the entrance. The terminal controller 11 may narrow down the candidate shops based on the position of an entrance close to the parking space where the vehicle 30 can park. The terminal controller 11 may narrow down the candidate shops to shops located within a predetermined distance from an entrance close to the parking space where the vehicle 30 can park. The terminal controller 11 is not limited to these examples. Candidate shops may be narrowed down by various criteria.

The terminal controller 11 may set the candidate shop directly as the shop to be used. When a plurality of shops is included as candidate shops, the plurality of shops may be set as shops to be used. The terminal controller 11 may notify the user of the vehicle 30 of the candidate shops. The terminal controller 11 may receive an operation input from the user, via the input interface 15, for confirming whether a candidate shop may be set as the shop to be used. The terminal controller 11 sets the candidate shop as the shop to be used when the user confirms that the candidate shop may be set as the shop to be used. When a plurality of shops is determined as candidate shops, the terminal controller 11 may receive an operation input from the user, via the input interface 15, for selecting a candidate shop to be set as the shop to be used. The terminal controller 11 sets the candidate shop selected by the user as the shop to be used.

As described above, the terminal controller 11 determines the candidate shop and causes the user to select or confirm the shop that becomes the shop to be used. This makes it easier for a shop matching the preferences of the user to be set as the shop to be used. User convenience can therefore be improved.

(Example of Information Processing Method Performed by Information Processing Apparatus)

Figure 4:
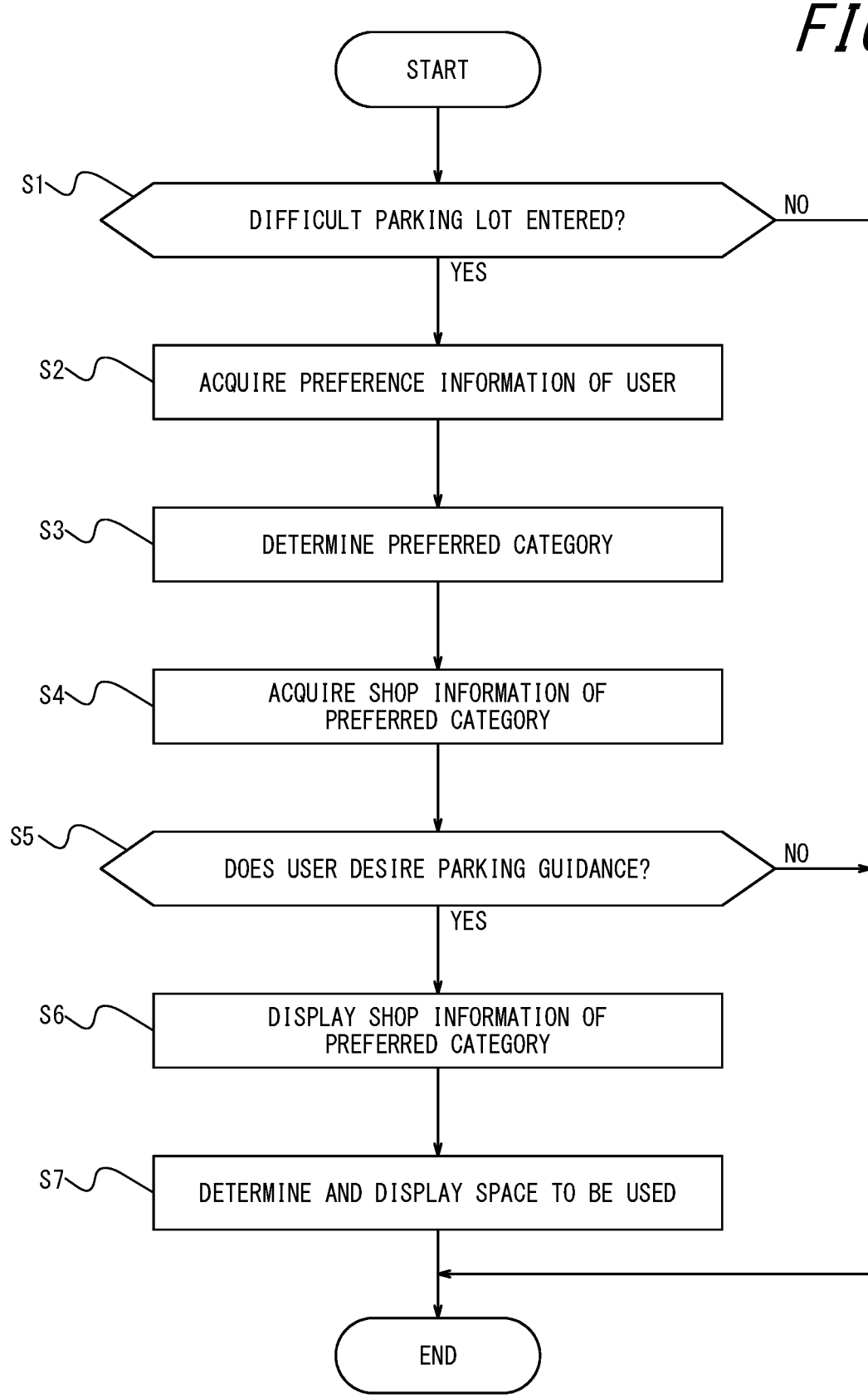
FIG. 4 is a flowchart illustrating an example of an information processing method according to an embodiment.

When the vehicle 30 enters a difficult parking lot, the terminal controller 11 may, for example, perform an information processing method including the procedures of the flowchart illustrated in FIG. 4. By performing the illustrated information processing method, the terminal controller 11 can determine the shop to be used based on the preferences of the user of the vehicle 30, determine the entrance to be used based on the position of the shop to be used, and output the position of the entrance to be used to the vehicle 30. When the server 20 functions as an information processing apparatus, the information processing method is performed by the server controller 22. The information processing method may be implemented as an information processing program to be executed by the terminal controller 11 or the server controller 22. The information processing program may be stored on a non-transitory computer readable medium.

The terminal controller 11 determines whether the vehicle 30 has entered a difficult parking lot (step S1). When the vehicle 30 has not entered a difficult parking lot (step S1: NO), the terminal controller 11 ends the procedures of the flowchart in FIG. 4.

When the vehicle 30 has entered a difficult parking lot (step S1: YES), the terminal controller 11 acquires the preference information for the user of the vehicle 30 (step S2). The terminal controller 11 may acquire the preference information from an external apparatus. The terminal controller 11 may generate the preference information by calculating the score of a category based on the content of an operation input from the user received by the input interface 15 of the terminal apparatus 10. The procedure for calculating the score based on the operation input from the user is described below.

The terminal controller 11 determines a category that matches the preferences of the user based on the preference information for the user of the vehicle 30 (step S3). The category that matches the preferences of the user is also called a preferred category. Specifically, the terminal controller 11 assigns a priority rank to each category based on the preference information and identifies the categories into which the shops of the complex facility 5 are classified. The terminal controller 11 then determines the category with the highest priority rank, based on the preference information, as the preferred category among the categories into which the shops of the complex facility 5 are classified. In other words, the terminal controller 11 judges whether the shops of the complex facility 5 are classified in each category in order from the highest priority rank category based on the preference information and determines the top category as the preferred category among the categories into which the shops of the complex facility 5 are classified.

The terminal controller 11 acquires information about the shops included in the preferred category (step S4). The information about the shops included in the preferred category is also referred to as shop information for the preferred category. Specifically, the shop information for the preferred category includes information about the shops included in the preferred category. The information about the shop includes information representing the position or name of the shop, the category into which the shop is classified, or the like. The terminal controller 11 may consider shops included in the preferred category to be candidate shops.

The store information for the preferred category includes information about the position of the entrance that the user of the vehicle 30 is recommended to pass through to move from the parking lot 6 to the candidate shop. The entrance recommended to pass through to move from the parking lot 6 to the candidate shop is also referred to as a candidate entrance. The terminal controller 11 acquires the position of each entrance included in the complex facility 5 and determines the candidate entrance corresponding to each candidate shop based on the position of the candidate shop. The terminal controller 11 may, for example, determine the entrance closest to the candidate shop as the candidate entrance. The terminal controller 11 may, for example, determine an entrance that enables barrier-free movement to the candidate shop as the candidate entrance. When the candidate shops include a plurality of shops, the terminal controller 11 may determine the entrance with the shortest route for patrolling the plurality of candidate shops as the candidate entrance corresponding to the plurality of candidate shops.

The terminal controller 11 judges whether the user desires parking guidance (step S5). Parking guidance includes guidance on the position of the candidate entrance or entrance to be used. The parking guidance may include guidance on the space to be used. The parking guidance may include guidance on the shop information for the preferred category. Specifically, the terminal controller 11 may cause the output interface 13 of the terminal apparatus 10 to display a question asking the user whether the user desires parking guidance and may prompt the user to input an answer to the input interface 15 of the terminal apparatus 10. The terminal controller 11 receives input, via the input interface 15, of the answer to the question of whether the user desires guidance on the parking position. When the user inputs an answer indicating a desire not to receive guidance on the parking position, the terminal controller 11 judges that the user does not desire parking guidance (step S5: NO) and ends the procedures of the flowchart in FIG. 4. When the user inputs an answer indicating a desire for guidance on the parking position, the terminal controller 11 judges that the user desires parking guidance (step S5: YES), and the process proceeds to step S6.

When the user desires parking guidance (step S5: YES), the terminal controller 11 displays the shop information of the preferred category (step S6). Specifically, when the shop information of the preferred category includes information about one shop, i.e. when there is only one candidate shop, the terminal controller 11 determines the candidate shop as the shop to be used.

When the shop information of the preferred category includes information about a plurality of shops, i.e. when the candidate shops include a plurality of shops, the terminal controller 11 may determine all of the candidate shops as the shops to be used or may determine only a portion of the candidate shops as the shops to be used. The terminal controller 11 may cause the output interface 13 to display information about at least a portion of the candidate shops to notify the user and may cause the user to select a shop as the shop to be used. The terminal controller 11 determines the shop to be used based on input of the selection from the user. The terminal controller 11 may determine a plurality of candidate shops as shops to be used. The output interface 13 may display the position of the candidate shop on a map of the shop floor of the complex facility 5. The output interface 13 may output information about the candidate shop as audio information.

The terminal controller 11 causes the output interface 13 to display the information about the determined shop to be used. The terminal controller 11 may cause the output interface 13 to display the position of the determined shop to be used to notify the user of the vehicle 30 of the position. The terminal controller 11 outputs the position of the entrance to be used corresponding to the determined shop to be used to the vehicle 30. The terminal controller 11 may cause the output interface 13 to display the position of the entrance to be used to notify the driver of the vehicle 30 of the position. The output interface 13 may display the position of the shop to be used on a map of the shop floor of the complex facility 5. The output interface 13 may display the position of the entrance to be used on a map of the parking floor. The output interface 13 may also display the position of the terminal apparatus 10 obtained by the positional information acquisition interface 14, i.e. the position of the vehicle 30 in which the terminal apparatus 10 is mounted, on the map of the parking floor. The output interface 13 may output information about the shop to be used and the entrance to be used as audio information.

The terminal controller 11 determines the space to be used recommended for parking the vehicle 30 and causes the output interface 13 to display the position of the determined space to be used (step S7). The terminal controller 11 can be considered to output the position of the determined space to be used to the vehicle 30. Specifically, the terminal controller 11 determines the space to be used based on the position of the entrance to be used. The terminal controller 11 may determine the parking space closest to the entrance to be used among the parking spaces where the vehicle 30 can park, or a parking space located within a predetermined distance from the entrance to be used, as the space to be used. The terminal controller 11 may cause the output interface 13 to display the position of the space to be used to notify the driver of the vehicle 30 of the position. The output interface 13 may display the position of the space to be used on a map of the parking floor. The output interface 13 may also display the position of the terminal apparatus 10 obtained by the positional information acquisition interface 14, i.e. the position of the vehicle 30 in which the terminal apparatus 10 is mounted, on the map of the parking floor. The output interface 13 may output information about the space to be used as audio information. After performing the procedure of step S7, the terminal controller 11 ends the procedures of the flowchart in FIG. 4.

The terminal controller 11 may omit the procedure of step S5. In this case, the terminal controller 11 performs the procedure of step S6 regardless of what the user desires and displays the shop information of the preferred category to notify the user.

The terminal controller 11 may omit the procedure of step S7. In this case, the terminal controller 11 does not notify the driver of the vehicle 30 of the space to be used. The driver of the vehicle 30 determines the parking space by himself or herself. The driver of the vehicle 30 may determine the parking space based on the position of the entrance to be used displayed as the shop information of the preferred category in the procedure of step S6.

As described above, according to the information processing system 1 and the information processing method of the present embodiment, the entrance to be used that the user of the vehicle 30 is recommended to use is determined based on the preferences of the user of the vehicle 30. In this way, the driver of the vehicle 30 can select the parking position based on the position of the entrance to be used. That is, the driver of the vehicle 30 can easily select a parking position in a difficult parking lot. The user of the vehicle 30 can also easily visit a shop that matches the preferences of the user. Consequently, the convenience for the user of the vehicle 30 improves.

OTHER EMBODIMENTS

<Generating Preference Information>

In the present embodiment, the terminal apparatus 10 provides a function that enables the user of the vehicle 30 to search for a destination as a function of a car navigation apparatus. The terminal apparatus 10 causes the user of the vehicle 30 to select a category and displays shops, facilities, or the like included in the category selected by the user as search results for the destination. The terminal controller 11 can assign priority ranks to the categories as preference information for the user based on the content of the operation by which the user of the vehicle 30 searches for and sets the destination.

Figure 5:
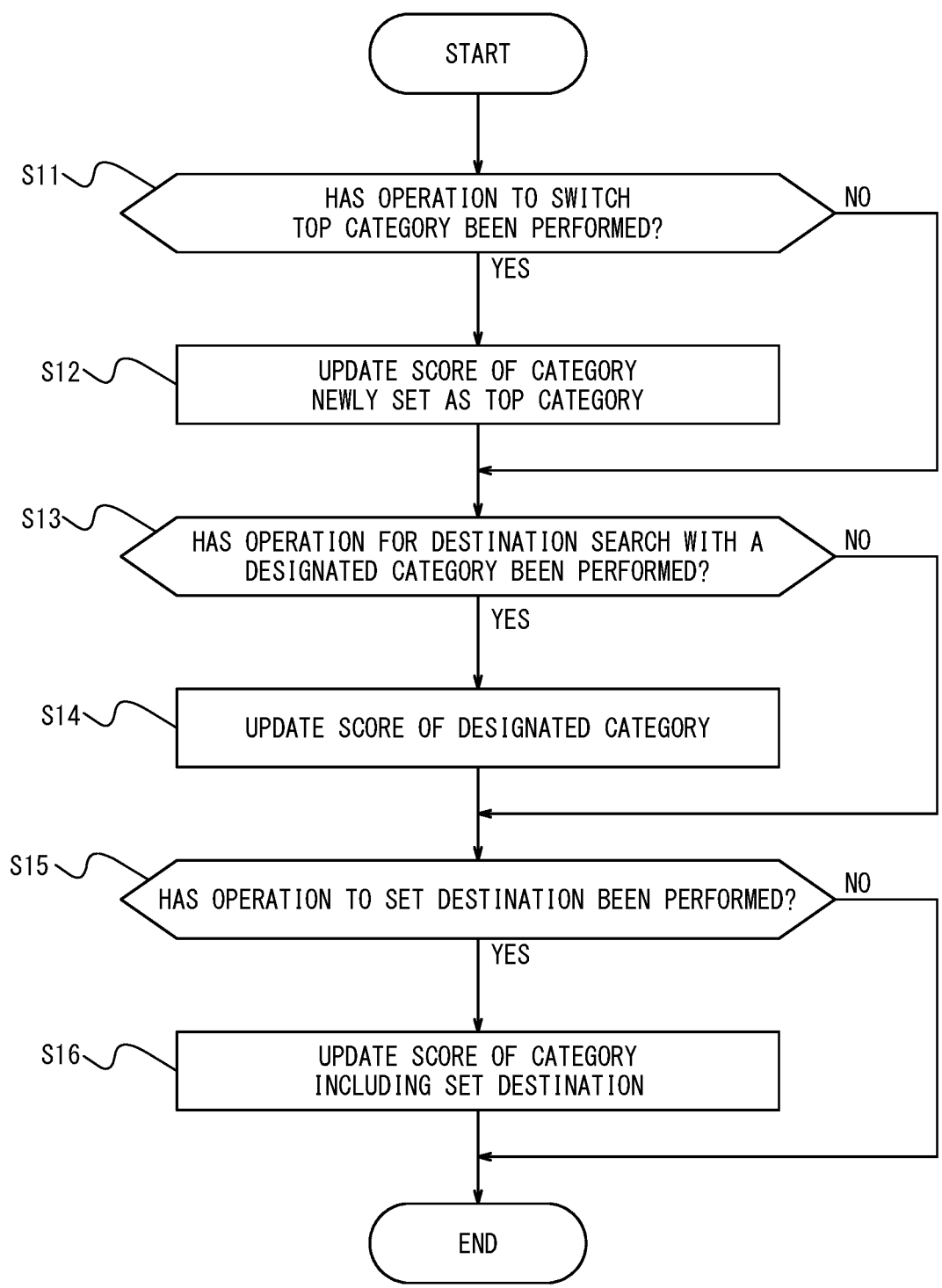
FIG. 5 is a flowchart illustrating an example of a procedure for calculating the score of a category.

The terminal controller 11 may, for example, perform an information processing method including the procedures of the flowchart illustrated in FIG. 5. The terminal controller 11 can calculate a score of the category as the preference information of the user of the vehicle 30 by performing the information processing method illustrated in FIG. 5. The information processing method may be performed by the server 20. The information processing method may be implemented as an information processing program to be executed by the terminal controller 11 or the server controller 22. The information processing program may be stored on a non-transitory computer readable medium.

The terminal controller 11 judges whether the user has performed an operation to switch the top category, set in the user interface, used to search for the destination (step S11). The top category refers to a category that is set to be displayed on the top screen of the search so that the user can easily designate the category when searching for a destination. The top category can be considered a category designated as a "favorite".

When the operation to switch the top category has not been performed (step S11: NO), the terminal controller 11 proceeds to step S13. When the operation to switch the top category has been performed (step S11: YES), the terminal controller 11 updates the score of the category newly set as the top category (step S12). Specifically, the terminal controller 11 adds a first predetermined value to the score of the category to be updated. The first predetermined value may, for example, be set to 10 points but is not limited to this example.

The terminal controller 11 judges whether the user has performed an operation to designate a category and search for a destination (step S13). The destination search with a designated category corresponds to a function for displaying shops, facilities, or the like included in the designated category as search results, or displaying shops, facilities, or the like that have been narrowed down based further on other conditions as search results.

When the operation for a destination search with a designated category has not been performed (step S13: NO), the terminal controller 11 proceeds to step S15. When the operation for a destination search with a designated category has been performed (step S13: YES), the terminal controller 11 updates the score of the category designated for searching for the destination (step S14). Specifically, the terminal controller 11 adds a second predetermined value to the score of the category to be updated. The second predetermined value may be set to a value smaller than the first predetermined value. The second predetermined value may, for example, be set to 1 point but is not limited to this example.

The terminal controller 11 judges whether the user has performed an operation to set the destination (step S15).

When the operation to set the destination has not been performed (step S15: NO), the terminal controller 11 ends the procedures of the flowchart in FIG. 5. When the operation to set the destination has been performed (step S15: YES), the terminal controller 11 updates the score of the category including the set destination (step S16). In other words, the terminal controller 11 updates the score of the category into which the shop, facility, or the like set as the destination is classified. Specifically, the terminal controller 11 adds a third predetermined value to the score of the category to be updated. The third predetermined value may be set to a value smaller than the first predetermined value.

The third predetermined value may, for example, be set to 1 point but is not limited to this example. The third predetermined value may be set to the same value as the second predetermined value or set to a different value. After performing the procedure of step S16, the terminal controller 11 ends the procedures of the flowchart in FIG. 5.

The degree of interest of the user can easily be reflected in the score of the category by the terminal controller 11 updating the score based on the search operation by the user, as described above. The degree of interest of the user may be reflected in the score, i.e. the preference information, to improve the user's satisfaction with the shop information of the preferred category determined based on the preference information. User convenience can therefore be improved.

The terminal controller 11 may determine the priority rank of a category without reference to the score. For example, the terminal controller 11 may change the priority rank of the category designated for the destination search to the highest priority rank or may increase the priority rank by a predetermined number of ranks. In this way, the terminal controller 11 can easily determine the priority rank of the category based on operations by the user regardless of whether scores are calculated. The degree of interest of the user can be reflected in the preference information by the priority rank of the category being determined based on user operation. Consequently, the user's satisfaction with the shop information of the preferred category determined based on the preference information can be improved while convenience for the user is also improved.

<<Modification to Generation of Preference Information>>

When calculating the score based on a search operation by the user, the terminal controller 11 may reduce the degree to which the operation contributes to the score as the number of days elapsed since performance of the operation increases. For example, the value added to the score of the category designated in a search operation one year before may be made less than the value added to the score of the category designated in a search operation one week before. Specifically, the terminal controller 11 may multiply the predetermined value to be added to a score based on a certain operation by a coefficient corresponding to the number of days elapsed since the operation was performed and add the resulting value to the score. In this case, the terminal controller 11 stores a log of the performed operations in memory and calculates the score based on the stored past operation log.

Specifically, the terminal controller 11 may change the value to be added to the score of each category based on the operation in accordance with the number of days elapsed since the user operation was performed, as illustrated below. Here, the categories are assumed to include a first category and a second category. A search operation designating the first category, an operation to set the first category as the top category, or the like is referred to as an operation related to the first category. A search operation designating the second category, an operation to set the second category as the top category, or the like is referred to as an operation related to the second category.

The terminal controller 11 is assumed to add, to the score of the first category, a value yielded by multiplying a predetermined value based on an operation related to the first category by a first coefficient corresponding to the number of days elapsed since the user performed the operation related to the first category. The number of days elapsed since the user performed the operation related to the first category is also referred to as the first elapsed day count. The terminal controller 11 is assumed to add, to the score of the second category, a value yielded by multiplying a predetermined value based on an operation related to the second category by a second coefficient corresponding to the number of days elapsed since the user performed the operation related to the second category. The number of days elapsed since the user performed the operation related to the second category is also referred to as the second elapsed day count.

Here, the first elapsed day count is less than the second elapsed day count. In other words, the operation related to the first category is assumed to have been performed more recently than the operation related to the second category. In this case, the terminal controller 11 sets the first coefficient to a value larger than the second coefficient. This makes it easier for recent operations to be reflected in the scores. Consequently, the terminal controller 11 can generate preference information with greater accuracy taking into consideration that the interests of the user vary over time.

When the user sets a predetermined category to the top category, the user is presumed to have a high degree of interest in that category. Therefore, when the first predetermined value to be added to the score of the category set as the top category is set to a value greater than the second predetermined value and the third predetermined value, the degree of interest of the user is more easily reflected in the score.

When a search for a destination is performed with a category designation in step S13, the terminal controller 11 updates the score of the category designated in the search. The terminal controller 11 may also update the score of the category that includes the shops, facilities, or the like included in the search result when the destination is searched for by a search method other than category designation, such as an alphabetical search or a onebox search. Specifically, the terminal controller 11 may add the same value as the second predetermined value, which is added to the score of the category designated in a search, to the score of the category that includes the shops, facilities, or the like included in the search result. The terminal controller 11 may add a fourth predetermined value different from the second predetermined value, which is added to the score of the category designated in a search, to the score of the category that includes the shops, facilities, or the like included in the search result. The fourth predetermined value may be set to a larger or smaller value than the second predetermined value. By the terminal controller 11 reflecting the search results of various search methods in the score, the degree of interest of the user is more easily reflected in the score.

The terminal controller 11 has been described as considering a category with a high score as a highly ranked category, but a category with a low score may be considered as a highly ranked category. In this case, the terminal controller 11 updates the score based on user operation by subtracting the predetermined value from the score rather than adding the predetermined value to the score.

<Examples of Other Forms of Complex Facility 5>
<<Configuration Example of Single Story Parking Lot Adjacent to a Single Story Complex Facility>>

As illustrated in FIG. 6, the complex facility 5 may be a single story complex facility including shops 54, 55, 56 aligned along the ground. The parking lot 6 adjacent to the complex facility 5 may be a single story parking lot including parking areas 64, 65, 66 aligned along the ground.

The shop 54 has a shop entrance 74, and the shop 56 has a shop entrance and 76. The complex facility 5 illustrated in FIG. 6 does not have an entrance for the facility overall. Therefore, the shop entrances 74, 76 are considered as being entrances of the complex facility 5. The shop 55 has a counter 75. The counter 75 is considered as being an entrance of the complex facility 5.

As illustrated by the procedure of step S6 in the flowchart of FIG. 4, the terminal controller 11 determines the shop to be used from among the shops 54, 55, 56 of the complex facility 5 and determines the entrance to be used based on the position of the shop to be used. If the complex facility 5 is a single story complex facility, the terminal controller 11 may determine any of the shop entrances 74, 76 and the counter 75 as the entrance to be used.

As illustrated by the procedure of step S7 in the flowchart of FIG. 4, the terminal controller 11 determines the space to be used based on the position of the entrance to be used. In the example of FIG. 6, when the shop entrance 74 of the shop 54 is determined as the entrance to be used, the terminal controller 11 may determine a parking space included in the parking area 64 closest to the shop entrance 74 as the space to be used. When the counter 75 of the shop 55 is determined as the entrance to be used, the terminal controller 11 may determine a parking space included in the parking area 65 closest to the counter 75 as the space to be used. When the shop entrance 76 of the shop 56 is determined as the entrance to be used, the terminal controller 11 may determine a parking space included in the parking area 66 closest to the shop entrance 76 as the space to be used.

<<Configuration Example in which Shop Floors and Parking Floors are not in One-to-One Correspondence>>

The first shop floor 51, the second shop floor 52, and the third shop floor 53 illustrated in FIG. 3 are shop floors each having an entrance from the parking lot 6. The complex facility 5 may, however, include a shop floor that does not have an entrance from the parking lot 6. The first shop floor 51, the second shop floor 52, and the third shop floor 53 that each have an entrance from the parking lot 6 are also referred to as entrance floors. In the complex facility 5 illustrated in FIG. 3, all of the shop floors correspond to entrance floors. The shop floors where shops to be used are located are also referred to as floors to be used.

The complex facility 5 might not have an entrance to a floor to be used. In other words, the floor to be used might not be the entrance floor. In this case, the terminal controller 11 may determine the entrance with the shortest vertical travel distance from the shop to be used as the entrance to be used. Vertical movement may take time due to limited means for movement or may place a physical burden on the user. Therefore, the convenience for the user can be improved by the shortest vertical travel distance being selected. The terminal controller 11 may determine the entrance with the shortest walking distance from the shop to be used as the entrance to be used. This can also improve convenience for the user.

As illustrated in FIG. 3, the first parking floor 61, the second parking floor 62, and the third parking floor 63 are parking floors connected to the complex facility 5 at substantially the same height as the entrance floor of the complex facility 5. In other words, the vertical travel distance is less than a predetermined distance when the user moves from the first parking floor 61, the second parking floor 62, or the third parking floor 63 to the entrance of the complex facility 5. On the other hand, the parking lot 6 may include a parking floor such that the user of the vehicle 30 needs to move vertically a predetermined distance or greater to move to the entrance floor of the complex facility 5. The first parking floor 61, the second parking floor 62, and the third parking floor 63 that are connected to the complex facility 5 at substantially the same height as the entrance floor of the complex facility 5 are also referred to as connecting floors.

The terminal controller 11 determines a parking space near the entrance to be used as the space to be used. However, there might be no parking space where the vehicle 30 can park on the connecting floor that is connected, at substantially the same height, to the entrance floor that has the entrance to be used. In this case, the terminal controller 11 determines a parking space of another parking floor as the space to be used. The terminal controller 11 may determine a parking space located on the parking floor where the difference in height with the entrance floor is smallest as the space to be used. The terminal controller 11 may determine a parking space such that the vertical travel distance to the shop to be used is shortest as the space to be used. The terminal controller 11 may determine a parking space such that the walking distance to the shop to be used is shortest as the space to be used. In this way, the convenience for the user can be improved.

<<Configuration Example of Parking Lot 6 Overlapping Shop Floor of Complex Facility 5>>

The parking lot 6 may overlap the shop floor of the complex facility 5. For example, the parking lot 6 may be located on the roof of the complex facility 5 or underground. The shop floor has a plurality of entrances to the parking lot 6 that overlaps the shop floor. The terminal controller 11 may determine the entrance to be used from among the plurality of entrances based on the position of the determined shop to be used. The terminal controller 11 may determine the space to be used based on the position of the entrance to be used.

<<Brief Summary>>

In complex facilities 5 and parking lots 6 of various forms, the information processing system 1 according to the present embodiment can determine an entrance to be used that is suitable for the user of the vehicle 30 that has entered the parking lot 6 and can output the position of the entrance to be used to the vehicle 30, as described above. User convenience can therefore be improved.

<Configuration Example in which Server 20 Functions as Information Processing Apparatus>

In the information processing system 1 according to the present embodiment, a configuration example in which the terminal apparatus 10 functions as an information processing apparatus has been described. As described above, the server 20 may perform at least some of the operations described as operations of the terminal apparatus 10 and function as an information processing apparatus. When functioning as an information processing apparatus, the server 20 outputs information, such as shop information of the determined preferred category, to the terminal apparatus 10 and causes the output interface 13 of the terminal apparatus 10 to display the information in order to notify the user of the information. In this case, the terminal apparatus 10 may be a car navigation apparatus mounted on the vehicle 30 or may be a portable terminal, such as a smartphone, carried by the user of the vehicle 30. When the server 20 functions as an information processing apparatus and outputs the information to the terminal apparatus 10, the terminal apparatus 10 is also referred to as an onboard device.

<Examples of Other Forms of Vehicle 30>

Figure 7:
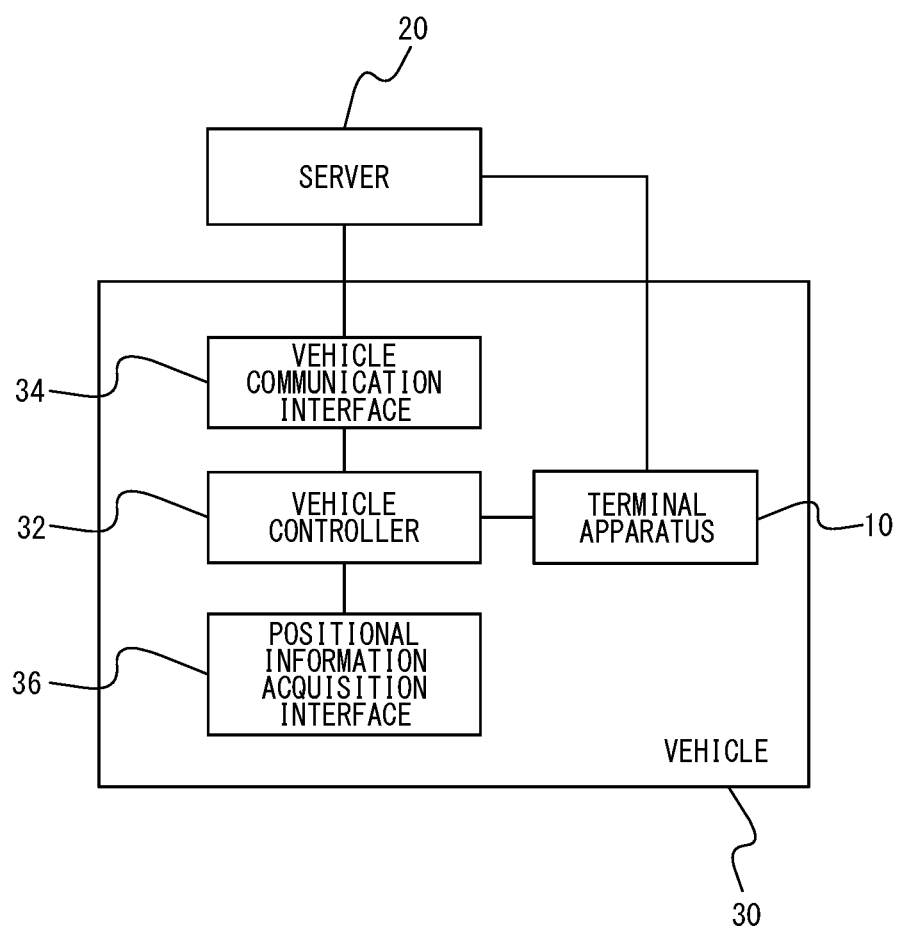
FIG. 7 is a block diagram illustrating a configuration example in which a vehicle is capable of traveling by autonomous operation.

As illustrated in FIG. 7, the information processing system 1 according to an embodiment includes the vehicle 30 and the server 20. The vehicle 30 includes a vehicle controller 32, a vehicle communication interface 34, and a positional information acquisition interface 36. The vehicle controller 32, the vehicle communication interface 34, and the positional information acquisition interface 36 are, for example, communicably connected to each other via an in-vehicle network, such as a controller area network (CAN), or a dedicated line.

The vehicle controller 32 controls the components included in the vehicle 30. The vehicle controller 32 may include one or more processors, may include one or more dedicated circuits instead of a processor, or may include a processor and one or more dedicated circuits. The vehicle controller 32 may be configured similarly to the terminal controller 11. The vehicle 30 or the vehicle controller 32 may include a memory.

The vehicle communication interface 34 is communicably connected to the server 20. The vehicle communication interface 34 may, for example, be an in-vehicle communication device. The vehicle communication interface 34 may include a communication module that communicably connects to a network or the server 20. The vehicle communication interface 34 may be configured similarly to the terminal communication interface 12.

The positional information acquisition interface 36 acquires positional information for the vehicle 30. The positional information acquisition interface 36 may be configured similarly to the positional information acquisition interface 14 of the terminal apparatus 10.

The vehicle 30 may be configured to be driven by a driver. The vehicle 30 may be configured to be driven autonomously. The autonomous driving may be, for example, performed according to any level from Level 1 to Level 5 as defined by the Society of Automotive Engineers (SAE). The autonomous driving is not limited to the exemplified definition and may be performed based on other definitions.

The vehicle 30 may optionally further include the terminal apparatus 10. The terminal apparatus 10 is communicably connected to the vehicle controller 32 via an in-vehicle network or a dedicated line. The terminal apparatus 10 may be communicably connected to the server 20 via an external wireless network. The terminal apparatus 10 may be configured as a car navigation apparatus mounted on the vehicle 30. The terminal apparatus 10 may be included in the information processing system 1 as a portable terminal carried by the user of the vehicle 30.

When the vehicle 30 is controlled by autonomous driving, the vehicle controller 32 controls the travel of the vehicle 30 based on the positional information for the vehicle 30 acquired by the positional information acquisition interface 36. The terminal apparatus 10 or the server 20 outputs control information including information specifying the destination of the vehicle 30 to the vehicle controller 32. The vehicle controller 32 controls travel of the vehicle 30 based on the control information outputted by the terminal apparatus 10 or the server 20 and moves the vehicle 30 to the destination.

The terminal apparatus 10 or the server 20 determines the space to be used as the destination of the vehicle 30 by performing the above-described operations of the information processing apparatus and outputs information including the position of the space to be used to the vehicle controller 32. The vehicle controller 32 controls travel of the vehicle 30 based on the control information and the positional information for the vehicle 30 acquired by the positional information acquisition interface 36 and parks the vehicle 30 in the space to be used.

Instead of the terminal apparatus 10 or the server 20, the vehicle controller 32 may perform the above-described operations of the information processing apparatus and determine the space to be used as the destination of the vehicle 30. In this case, the vehicle controller 32 may cause the output interface 13 of the terminal apparatus 10 to display the information in order to notify the user of the vehicle 30 of the information.

As described above, the information processing system 1 according to the present embodiment can cause a vehicle 30 that travels by autonomous driving to park in a parking space determined based on preferences of the user of the vehicle 30. In this way, the user can easily visit a shop that matches the user's own preferences simply by designating the complex facility 5 as the destination. User convenience can therefore be improved.

While an embodiment of the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each of the means, steps, or the like can be rearranged without logical inconsistency, and a plurality of means, steps, or the like can be combined together or divided.

The invention claimed is:

1. An information processing apparatus comprising:
 a controller configured to:
  determine, based on a preference of a user of a vehicle that enters a parking lot adjacent to a complex facility having a plurality of shops and a plurality of facility entrances, a shop to be used by the user from among the plurality of shops, wherein the plurality of shops is classified by categories;
  determine an entrance to be used by the user from among the plurality of facility entrances based on a position of the shop to be used, and output a position of the entrance to be used to the vehicle;
  determine the shop to be used based on preference information specifying the preference of the user as a priority rank of the categories;
  determine the priority rank of the categories based on an operation, performed by the user, related to setting of a destination of the vehicle;
  calculate a score determining the priority rank of the categories based on the operation, performed by the user, related to setting of the destination of the vehicle,
  wherein the priority rank of the categories is determined so that the priority rank increases as the score increases, the categories include a first category and a second category; and
  when a number of days elapsed since the user performed an operation designating the first category is less than a number of days elapsed since the user performed an operation designating the second category, the controller is configured to set a coefficient that is multiplied by a value added to a score of the first category to be greater than a coefficient that is multiplied by a value added to a score of the second category.

2. The information processing apparatus of claim 1, wherein the controller is configured to determine a facility entrance, among the plurality of facility entrances, with a shortest route to the shop to be used as the entrance to be used.

3. The information processing apparatus of claim 1, wherein the plurality of facility entrances includes entrances of the plurality of shops or counters of the plurality of shops.

4. The information processing apparatus of claim 1, wherein
 the complex facility includes a plurality of shop floors on which the plurality of shops is located,
 the plurality of shop floors includes a plurality of entrance floors having the plurality of facility entrances, and
 the controller is configured to determine a facility entrance, among the plurality of facility entrances, with a shortest vertical travel distance from the shop to be used as the entrance to be used.

5. The information processing apparatus of claim 4, wherein
 each shop floor in the plurality of shop floors corresponds to an entrance floor in the plurality of entrance floors, and
 the controller is configured to determine a facility entrance, among the plurality of facility entrances, of a floor to be used on which the shop to be used is located, as the entrance to be used.

6. The information processing apparatus of claim 4, wherein
 the parking lot includes a plurality of parking floors,
 each parking floor in the plurality of parking floors includes a plurality of parking spaces, and
 the controller is configured to determine a parking space, among the plurality of parking spaces, where the vehicle can park as a space to be used and output the parking space to the vehicle, the parking space being located on a parking floor, among the plurality of parking floors, with a smallest difference in height from an entrance floor, among the plurality of entrance floors, having the determined entrance to be used.

7. The information processing apparatus of claim 1, wherein
 the parking lot includes a plurality of parking spaces, and
 the controller is configured to determine a parking space, from among one or more parking spaces in which the vehicle can park among the plurality of parking spaces, with a shortest distance to travel to the entrance to be used and output the parking space to the vehicle.

8. An information processing system comprising:
 the information processing apparatus of claim 1; and
 the vehicle.

9. The information processing system of claim 8, wherein the information processing apparatus is mounted on the vehicle.

10. The information processing system of claim 8, wherein the information processing apparatus is carried by the user of the vehicle.

11. The information processing system of claim 8, wherein the vehicle comprises an onboard device configured to connect communicably to the information processing apparatus.

12. An information processing method comprising:
 determining, by an information processing apparatus, based on a preference of a user of a vehicle that enters a parking lot adjacent to a complex facility having a plurality of shops and a plurality of facility entrances, a shop to be used by the user from among the plurality of shops;
 determining, by the information processing apparatus, an entrance to be used by the user from among the plurality of facility entrances based on a position of the shop to be used, and outputting a position of the entrance to be used to the vehicle;
 classifying, by the information processing apparatus, the plurality of shops by categories;

determining, by the information processing apparatus, the shop to be used based on preference information specifying the preference of the user as a priority rank of the categories;

determining the priority rank of the categories based on an operation, performed by the user, related to setting of a destination of the vehicle;

calculating a score determining the priority rank of the categories based on the operation, performed by the user, related to setting of the destination of the vehicle, wherein the priority rank of the categories is determined so that the priority rank increases as the score increases, the categories include a first category and a second category; and when a number of days elapsed since the user performed an operation designating the first category is less than a number of days elapsed since the user performed an operation designating the second category, setting a coefficient that is multiplied by a value added to a score of the first category to be greater than a coefficient that is multiplied by a value added to a score of the second category.

13. The information processing method of claim 12, further comprising:

determining, by the information processing apparatus, a facility entrance among the plurality of facility entrances with a shortest route to the shop to be used as the entrance to be used.

* * * * *